US006702562B2

(12) United States Patent
Shikama et al.

(10) Patent No.: US 6,702,562 B2
(45) Date of Patent: Mar. 9, 2004

(54) APPARATUS FOR MANUFACTURING BEAD INDUCTOR

(75) Inventors: Takashi Shikama, Yokaichi (JP); Masami Sugitani, Omihachiman (JP); Hisato Oshima, Yokaichi (JP); Junichi Inoue, Omihachiman (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 177 days.

(21) Appl. No.: 10/066,718

(22) Filed: Feb. 6, 2002

(65) Prior Publication Data

US 2002/0102319 A1 Aug. 1, 2002

Related U.S. Application Data

(62) Division of application No. 09/388,797, filed on Sep. 2, 1999, now Pat. No. 6,375,884.

(30) Foreign Application Priority Data

Sep. 4, 1998 (JP) .......................................... 10-251100

(51) Int. Cl.[7] .......................... B29C 45/14; B29C 70/72

(52) U.S. Cl. .................... 425/120; 425/125; 425/129.1; 425/573; 425/577

(58) Field of Search ................................ 425/112, 117, 425/120, 125, 129.1, 544, 577, 127, 573

(56) References Cited

U.S. PATENT DOCUMENTS

| | | | | | |
|---|---|---|---|---|---|
| 1,284,553 | A | * | 11/1918 | Apple | 425/129.1 |
| 2,018,480 | A | * | 10/1935 | Apple | 425/577 |
| 3,254,372 | A | * | 6/1966 | Hofbauer | 425/129.1 |
| 3,268,845 | A | * | 8/1966 | Stampfli | 425/129.1 |
| 3,293,694 | A | * | 12/1966 | Taylor, Jr. | 425/129.1 |
| 3,543,349 | A | * | 12/1970 | Marocco | 425/129.1 |
| 3,584,345 | A | * | 6/1971 | Beastrom | 425/129.1 |
| 3,809,733 | A | * | 5/1974 | Sandford et al. | 425/120 |
| 4,025,269 | A | * | 5/1977 | Reinders | 425/577 |
| 4,075,273 | A | * | 2/1978 | Liautaud | 264/250 |
| 4,193,185 | A | * | 3/1980 | Liautaud | 264/272.19 |
| 4,385,025 | A | * | 5/1983 | Salerno et al. | 425/112 |
| 6,189,204 | B1 | * | 2/2001 | Shikama et al. | 29/608 |

FOREIGN PATENT DOCUMENTS

| | | |
|---|---|---|
| JP | 55-18026 | 2/1980 |
| JP | 58-34988 | 3/1983 |
| JP | 2-249217 | 10/1990 |

* cited by examiner

*Primary Examiner*—Robert B. Davis
(74) *Attorney, Agent, or Firm*—Keating & Bennett, LLP

(57) ABSTRACT

A method of producing a bead inductor includes the steps of forming an outer portion outside of a conductor coil, and forming a molded body with the conductor coil embedded therein. The outer portion is formed outside of the conductor coil by disposing the conductor coil in a cavity defined by first and second mold portions, with first and second gates formed in the first mold portion, inserting first and second spacer pin portions, which define a spacer pin which passes through the conductor coil and extends to and closes the second gate, and supplying material containing magnetic powder into the mold cavity from the first gate. The molded body is formed by closing the first gate after the formation of the outer portion, and supplying from the second gate material containing magnetic powder into a space formed by removing the spacer pin portions.

7 Claims, 9 Drawing Sheets

APPARATUS FOR MANUFACTURING BEAD INDUCTOR

This application is a Divisional of U.S. patent application Ser. No. 09/388,797 filed Sep. 2, 1999, now U.S. Pat. No. 6,375,884.

BACKGROUND OF THE INVENTION

1. Field of the Invention

The present invention relates to a method of producing a bead inductor and an apparatus for producing a molded body to be included in a bead inductor.

2. Description of the Related Art

Bead inductors are used as anti-noise or noise elimination components, particularly in microprocessors or other similar devices, in which a large amount of current needs is supplied and transmitted. A bead inductor consisting of a conductor coil embedded in rubber or resin material containing magnetic powder (such as ferrite powder) is known. In general, in forming this type of bead inductor, a conductor coil is embedded in resin or rubber material via injection molding or the like, whereby a molded body is formed. Then, both ends of the molded body are cut to expose both ends of the coil embedded in the resin or the rubber material. Thereafter, metallic caps which define external terminal electrodes, are mounted on the exposed coil ends, for example, by using an electrically conductive, resinous paste or via spot welding.

FIGS. 6 and 7 are sectional views illustrating a method of producing a molded body used to form a bead inductor via injection molding. It is noted that the subject matter shown in FIGS. 6 and 7 and the description thereof contained herein has not yet been published.

Referring to FIG. 6, an injection mold, used to form a molded body to be included in a bead inductor, includes an upper mold portion 1 and a lower mold portion 2. A cavity 3 in which resin is molded is formed in the upper mold portion 1. A space 3*a* provided to form a projecting portion on the molded body is formed above the cavity 3. At the lower mold portion 2, a spacer pin 4 is arranged to be located within the cavity 3 when the lower mold portion 2 and the upper mold portion 1 are fitted together. A gate 1*a* used to supply molten resin into the cavity 3 is formed in the upper mold portion 1.

When a molded body used for forming a bead inductor is produced using the mold of FIG. 6, a conductor coil, which is formed by winding into a spiral or other shaped configuration, a metallic wire, such as a copper wire, coated with an insulating material, such as polyester resin, is inserted onto the spacer pin 4. Then, molten resin containing magnetic powder, such as ferrite powder, is injected into the cavity 3 from the gate 1*a*, causing an outer portion to be formed outside of the conductor coil inserted onto the spacer pin 4.

FIG. 7 is a sectional view showing a state in which the outer portion is formed outside of a conductor coil 5 using the above-described method. As shown in FIG. 7, the conductor coil 5 is embedded in the molded body 6, and the spacer pin 4 is located inside of the conductor coil 5. This spacer pin 4 is pulled out of the molded body 6 in order to allow formation of an inner portion located inside of the conductor coil 5.

FIGS. 8A, 8B, and 8C are sectional views illustrating the steps carried out to form an inner portion inside of the conductor coil 5 via molding. FIG. 8A illustrates the molded body 6, with the upper mold portion 1 and the lower mold portion 2 being separated from each other as a result of moving the upper mold portion 1 upward from its position shown in FIG. 7. The spacer pin 4 is disposed in the molded body 6, and is mounted on the lower mold portion 2. The molded body 6 has a protruding portion 6*a* at the top portion thereof. The protruding portion 6*a* is removed by cutting or a similar process, thereby, allowing the spacer pin 4 in the molded body 6 to be pulled upward and removed therefrom.

FIG. 8B illustrates a state after removal of the spacer pin 4 by the above-described method. A space 6*b* is formed in the molded body 6 as a result of the removal of the spacer pin 4. With the space 6*b* being formed in the molded body 6, the upper mold portion 1 is fitted onto the lower mold portion 2 again, as shown in FIGS. 6 and 7. From the gate 1*a*, molten resin is supplied into the mold so as to flow into the space 6*b*, causing an inner portion to be formed inside of the conductor coil 5.

FIG. 8C is a sectional view illustrating a state after formation of an inner portion inside of the conductor coil 5 via molding. A protruding portion 6*c* corresponding to a configuration of the space 3*a* of FIG. 6 is formed at the top portion of the molded body 6, while a protruding portion 6*d* is formed at the bottom portion of the molded body 6 so as to be disposed in the space in the lower mold portion 2 where the spacer pin 4 was inserted.

FIG. 9 is a sectional view of the molded body 6 formed by the above-described molding method. The conductor coil 5 is embedded in the molded body 6. The protruding portion 6*c* is formed at the top portion of the molded body 6, while the protruding portion 6*d* is formed at the bottom portion of the molded body 6. By cutting the molded body 6, using, for example, a dicing saw, along cutting lines A—A and B—B, the ends of the conductor coil 5 in the molded body 6 are exposed. Metallic caps are electrically connected and mounted to the exposed ends of the conductor coil 5, for example, by using electrically conductive resinous paste or via spot welding.

FIGS. 10 and 11 are a side view and a plan view illustrating a bead inductor having metallic caps mounted thereon. One end sa of the conductor coil 5 is electrically connected to a metallic cap 7, while the other end 5*b* of the conductor coil 5 is electrically connected to a metallic cap 8. The metallic caps 7 and 8 are used as external terminal electrodes.

In the above-described bead inductor and method of forming thereof, the spacer pin is removed after formation of the outer portion located outside of the conductor coil via molding. To remove the spacer pin, it is necessary to open the mold and to cut the protruding portion at the top portion of the molded body. This makes it difficult to automate and simplify the injection molding cycle. Therefore, when the conventional bead inductor production method is used, molded bodies cannot be formed with high productivity.

SUMMARY OF THE INVENTION

To overcome the problems described above, preferred embodiments of the present invention provide a method of manufacturing a bead inductor and a bead inductor molded body producing apparatus, which achieve improved and highly efficient production of bead inductor molded bodies having a conductor coil embedded therein.

According to a first aspect of preferred embodiments of the present invention, there is provided a method of producing a bead inductor, in which a molded body having a hollow core conductor coil embedded in rubber or resin material containing magnetic powder is formed, and in which both ends of the conductor coil in the molded body are exposed to electrically connect external terminal electrodes to both of the exposed ends of the conductor coil, the method including the steps of forming an outer portion outside of the conductor coil via molding, by disposing the conductor coil in a cavity of a mold having a first gate and a second gate formed therein, disposing a spacer pin which passes through the core of the conductor coil and extends up to the second gate to close the second gate, and supplying the rubber or the resin material containing magnetic powder into the mold cavity from the first gate and forming the molded body with the conductor coil embedded therein, by, after the formation of the outer portion outside of the conductor coil, closing the first gate, pulling the spacer pin out of the mold cavity, and supplying from the second gate the rubber or the resin material containing magnetic powder into a space formed as a result of the removal of the spacer pin so as to extend through the core of the conductor coil, in order to form an inner portion inside of the conductor coil.

In such a case, after the formation of the outer portion outside of the conductor coil, the spacer pin is pulled out. When the outer portion is formed outside of the conductor coil via molding, the spacer pin is disposed so as to pass through the core of the conductor coil and to extend up to the second gate to close the second gate. When the spacer pin is pulled out, a space which extends through the core of the conductor coil from the second gate is formed. From the second gate, resin or rubber material is supplied into the space located inside of the conductor coil. In the first aspect, the outer portion does not have to be removed after the formation of the outer portion outside of the conductor coil, so that the next step of forming an inner portion inside of the conductor coil can be carried out with the outer portion being disposed in the mold cavity.

The mold may have an accommodating hole for accommodating the spacer pin therein. When the outer portion is formed outside of the conductor coil via molding, a portion of the spacer pin may be pushed out of the accommodating hole and pushed into the mold cavity. On the other hand, when the inner portion is formed inside of the conductor coil via molding, the spacer pin may be pulled out so that a portion of the spacer pin is accommodated in the accommodating hole.

In such a case, since an accommodating hole may be formed in the mold to allow insertion and removal of the spacer pin into and out of the cavity, it possible to provide a an excellent and greatly improved production method which allows automation and simplification of the molding process.

The mold may include an upper mold portion and a lower mold portion.

In such a case, since the mold may include an upper mold portion and a lower mold portion, it possible to stably and easily insert the conductor coil into the mold.

When the mold includes an upper mold portion and a lower mold portion, the spacer pin may be divided into a first spacer pin portion and a second spacer pin portion, the first spacer pin portion having a shape which fits into the accommodating hole formed in the lower mold portion, and the second spacer pin portion having a shape which fits into the second gate formed in the upper mold portion. In forming the outer portion outside of the conductor coil via molding, a portion of the first spacer pin portion and a portion of the second spacer pin portion of the spacer pin may be pushed into the mold cavity from the accommodating hole and from the second gate, respectively, in order to bring the first spacer pin portion and the second spacer pin portion into contact with each other, whereby the spacer pin is formed so as to pass through the mold cavity. On the other hand, in forming the inner portion inside of the conductor coil via molding, the first spacer pin portion may be pulled out so that a portion thereof is accommodated in the accommodating hole formed in the lower mold portion, and the second spacer pin portion may be pulled out and removed out of the mold from the second gate.

In such a case, the spacer pin may be divided into a first spacer pin portion and a second spacer pin portion and formed so as to pass through the mold cavity. In forming the outer portion outside of the conductor coil via molding, a spacer pin may be formed by pushing a portion of the first spacer pin portion and a portion of the second spacer pin portion into the mold cavity and causing the first and second spacer pin portions to contact each other. Thus, compared to the case where one spacer pin is pushed into the mold cavity from the lower mold portion so that the spacer pin passes through the mold cavity and is inserted into the second gate formed in the upper mold portion to close it, the upper mold portion and the lower mold portion can be easily designed so that they are, for example, positioned precisely with respect to each other.

When the spacer pin is divided into a first spacer pin portion and a second spacer pin portion and formed so as to pass through the mold cavity, the first gate may be formed in the upper mold portion.

In such a case, since the first gate may be formed in the upper mold portion, it is much easier to design, for example, a molding machine or a mold.

In the case where the spacer pin is divided into a first spacer pin portion and a second spacer pin portion and formed so as to pass through the mold cavity, or in the case where the first gate is formed in the upper mold portion, when the conductor coil is disposed in the mold cavity, a portion of the first spacer pin portion may be pushed out of the accommodating hole, and the core of the conductor coil may be mounted onto the first spacer pin portion in order to position the conductor coil in the cavity.

In such a case, since the conductor coil may be positioned by inserting the core of the conductor coil onto the first spacer pin portion, it is much easier to design a molding machine.

In forming the inner portion inside of the conductor coil via molding, the first gate may be closed by inserting a closing pin into the first gate.

In such a case, since the first gate may be closed by inserting a closing pin into the first gate, the structure of, for example, a molding machine or a mold is greatly simplified.

When the first gate is closed by inserting a closing pin, after the formation of the inner portion inside of the conductor coil via molding, the molded body may be ejected from the mold by pushing a portion of the closing pin out of the first gate and inserting the portion of the closing pin into the mold cavity.

In such a case, since the molded body may be ejected from the mold via the closing pin used to close the first gate, the structure of, for example, a molding machine or a mold can be greatly simplified, and the molded body can be automatically ejected after molding.

In the case where the first gate is closed by inserting a closing pin into it or in the case where the molded body is ejected from the mold by using the closing pin used to close the first gate, during the formation of the inner portion inside of the conductor coil via molding, the second spacer pin portion which is removed out of the mold may be used as the closing pin for insertion into the first gate.

In such a case, since the second spacer pin portion may be used as the closing pin, the structure of, for example, a molding machine or a mold can be greatly simplified.

A molding cycle including the steps of inserting the conductor coil into the mold cavity, forming the outer portion outside of the conductor coil via molding, forming the inner portion inside of the conductor coil via molding, and ejecting the molded body from the mold may be repeated by automatic control.

In such a case, since the molding process carried out to form a bead inductor molded body may be automated, it is possible to increase operation efficiency of a molding machine, and to mass-produce molded bodies economically.

According to another aspect of preferred embodiments of the present invention, there is provided an apparatus for producing a molded body to be included in a bead inductor, in which the molded body is formed in a mold cavity via injection molding when producing the bead inductor by electrically connecting external terminal electrodes to both ends of a hollow core conductor coil disposed in the molded body formed by embedding the hollow core conductor coil in rubber or resin material containing magnetic powder, the apparatus including an upper mold portion having a first gate and a second gate arranged to allow rubber or the resin material containing magnetic powder to be supplied into the mold cavity, a lower mold portion which is fitted to the upper mold portion to define the mold cavity, the lower mold portion having an accommodating hole in a portion thereof located at a position in correspondence with a substantially center portion of the mold cavity, a first spacer pin portion arranged to be movably disposed in the accommodating hole in the lower mold portion, a second spacer pin portion arranged to be movably disposed in the second gate in the upper mold portion, and a closing pin arranged to be movably disposed in the first gate in the upper mold portion, wherein after insertion of the core of the conductor coil onto the first spacer pin portion, a portion of which first spacer pin portion is upwardly pushed out of the accommodating hole formed in the lower mold portion, the upper mold portion and the lower mold portion are fitted together to define the cavity used for the injection molding, the second spacer pin portion is pushed downward so that a portion thereof is pushed out of the second gate in the upper mold portion in order to bring the second spacer pin portion into contact with the first spacer pin portion, whereby a spacer pin which passes through the cavity is formed. In this state, the rubber or the resin material containing magnetic powder is supplied into the cavity from the first gate to form an outer portion outside of the conductor coil the molding. After the molding, the first spacer pin portion is pulled out so that a portion thereof is accommodated in the accommodating hole formed in the lower mold portion, and the second spacer pin portion is pulled out and removed out of the mold from the second gate. A closing pin is inserted into the first gate to close the first gate. From the second gate, the rubber or the resin material containing magnetic powder is supplied into a space formed inside of the conductor coil, by pulling out the first spacer pin portion and the second spacer pin portion, whereby the molded body having the conductor coil embedded therein is formed.

In such a case, after the formation of the outer portion outside of the conductor coil via molding, an inner portion can be formed inside of the conductor coil, without taking out the outer portion from the mold. This makes it possible to produce molded bodies efficiently and easily.

In the above-described device, the closing pin may be used as the second spacer pin portion.

In such a case, the structure of, for example, an injection mold or a mold can be greatly simplified. This makes it possible to automate the molding process and to reduce molding costs.

When the apparatus according to preferred embodiments of the present invention is used or when the closing pin is used as the second spacer pin portion, after the formation of the molded body with the conductor coil embedded therein, the upper mold portion and the lower mold portion which have been fitted together may be separated from each other, and the closing pin may be moved downward to push out and eject the molded body from the cavity.

In such a case, since the molded body may be pushed out of and ejected from the cavity by moving the closing pin downward, the molded body can be easily taken out, and the molding process can be automated.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

Figure 1:
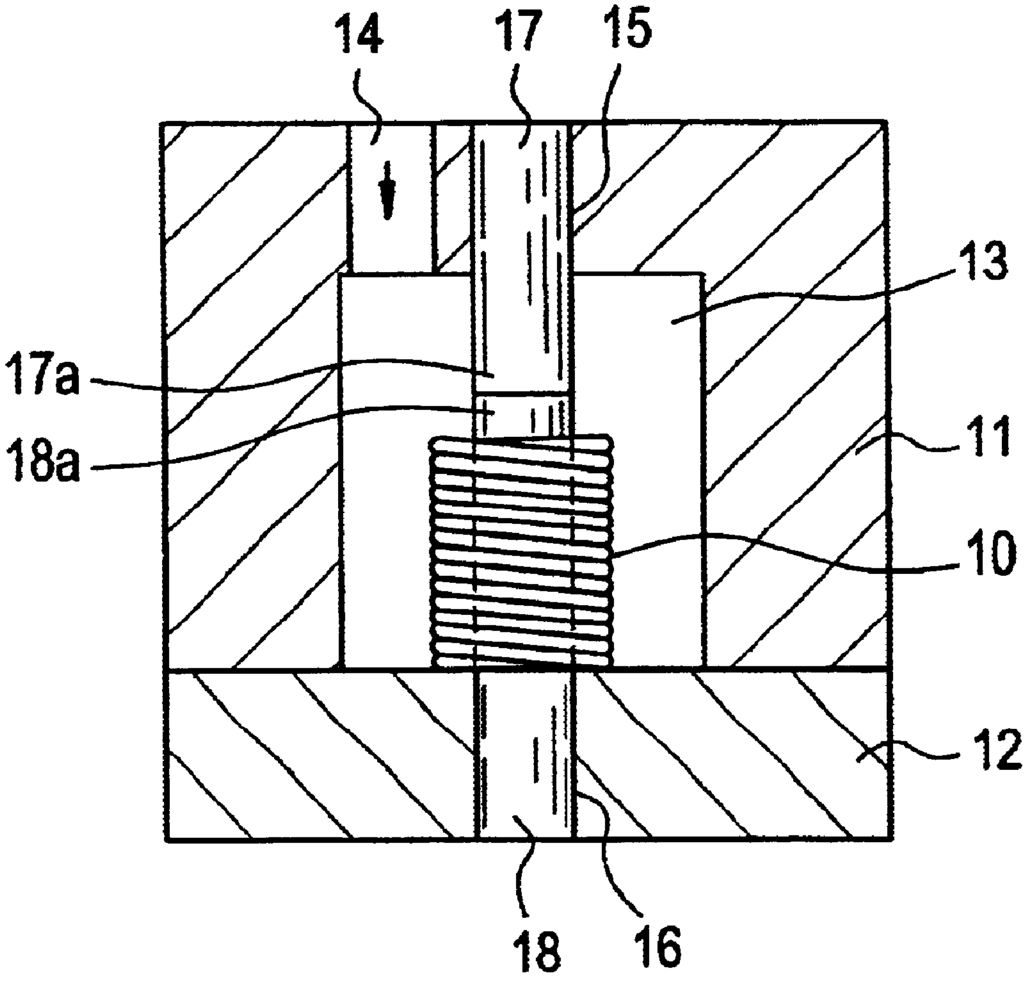
FIG. 1 is a sectional view illustrating a method of producing a molded body to be included in a bead inductor, according to a preferred embodiment of the present invention.

FIG. 1 is a sectional view of a mold of an apparatus for producing a molded body to be included in a bead inductor, according to a preferred embodiment of the present invention. This mold is used to form a molded body via injection molding. The mold preferably includes an upper mold portion 11 and a lower mold portion 12. As shown in FIG. 1, when the upper mold portion 11 and the lower mold portion 12 are fitted together, a cavity 13 is formed. A molded body will be formed in the cavity 13 as described below.

A first gate 14 and a second gate 15 are provided at the upper mold portion 11. The first gate 14 and the second gate 15 are arranged to allow rubber or molten resin containing magnetic powder to flow into the cavity 13. An accommodating hole 16 is formed in a portion of the lower mold portion 12 located so as to correspond to a location of the approximate center portion of the cavity 13. A first spacer pin portion 18 is movably disposed in the accommodating hole 16. A second spacer pin portion 17 is movably disposed in the second gate 15 formed in the upper mold portion 11.

In the state shown in FIG. 1, the first spacer pin portion 18 and the second spacer pin portion 17 are both pushed into the cavity 13 so that an end portion 18*a* of the first spacer pin portion 18 and an end portion 17*a* of the second spacer pin portion 17 contact each other. A closing pin (described later) can be movably disposed in the first gate 14. In the state shown in FIG. 1, the closing pin is disposed outside the mold.

A conductor coil 10 is inserted onto the first spacer pin portion 18. The coil 10 is preferably formed as an hollow core conductor coil by, for example, winding in a spiral or other configuration, a metallic wire (such as a copper wire) coated with an insulating material (such as polyester resin).

A description will now be given of the steps carried out to form a bead inductor molded body using the injection mold of FIG. 1, in accordance with preferred embodiments of the present invention.

Figure 2:
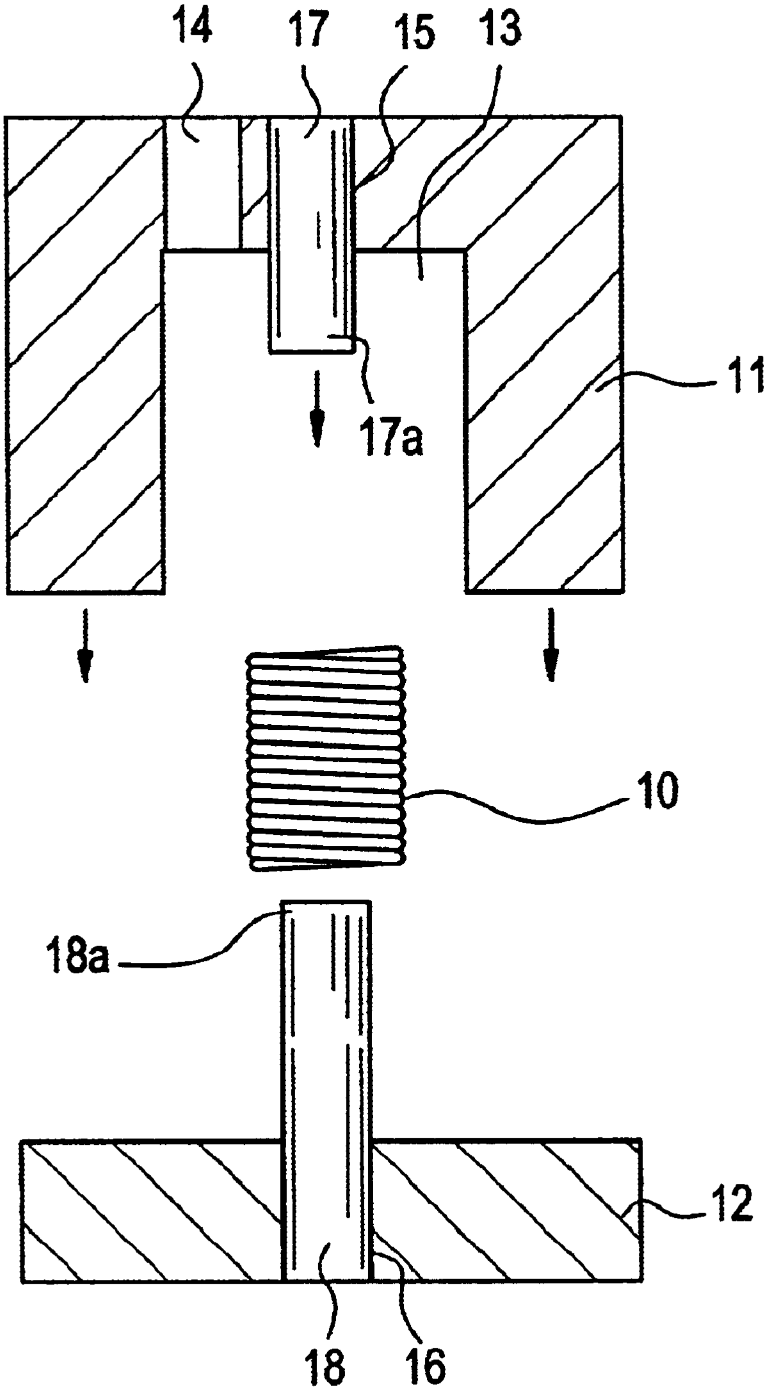
FIG. 2 is a sectional view illustrating a method of producing a molded body to be included in a bead inductor, according to a preferred embodiment of the present invention.

As shown in FIG. 2, when the conductor coil 10 is being placed in the mold, the mold is in an open state, with the upper mold portion 11 being located separate from and above the lower mold portion 12, and the lower mold portion 12 being disposed below the upper mold portion 11. With the mold in the open state, a portion of the first spacer pin portion 18 is pushed upward from the through hole 16 in the lower mold portion 12. The conductor coil 10 is disposed in the mold by inserting the hollow core of the conductor coil 10 onto the first spacer pin portion 18, so that the conductor coil 10 is fitted onto the first spacer pin portion 18. In other words, the conductor coil 10 is positioned in the cavity 13 by inserting the conductor coil 10 onto the first spacer pin portion 18.

The first gate 14 formed in the upper mold portion 11 is in an open state. The second spacer pin portion 17 is inserted into the second gate 15 so that the end portion 17*a* of the second spacer pin portion 17 is pushed downward and protrudes from the second gate 15. With the second spacer pin portion 17 protruding from the second gate 15, the upper mold portion 11 is moved downward relative to the lower mold portion 12 in order to fit the upper and lower mold portions 11, 12 together, as shown in FIG. 1. As shown in FIG. 1, the end portion 18*a* of the first spacer pin portion 18 and the end portion 17*a* of the second spacer pin portion 17 are brought into contact with each other in the cavity 13, whereby a spacer pin which passes through the cavity 13 in the vertical direction so as to pass through the hollow core of the coil 10 is formed. It is to be noted that the second spacer pin portion 17 does not necessarily have to be moved downward before fitting the upper mold portion 11 and the lower mold portion 12 together. The second spacer pin 17 may be moved downward so that the end portion 17*a* thereof comes into contact with the end portion 18*a* of the first spacer pin portion 18 after fitting the upper mold portion 11 and the lower mold portion 12 together.

In the state shown in FIG. 1, molten rubber or molten resin containing magnetic powder is injected into the cavity 13 from the first gate 14 to form an outer portion outside of the conductor coil 10 via molding. Since the spacer pin defined by the first spacer pin portion 18 and the second spacer pin portion 17 is disposed in the cavity 13, resin is molded in the area around the spacer pin.

Figure 3:
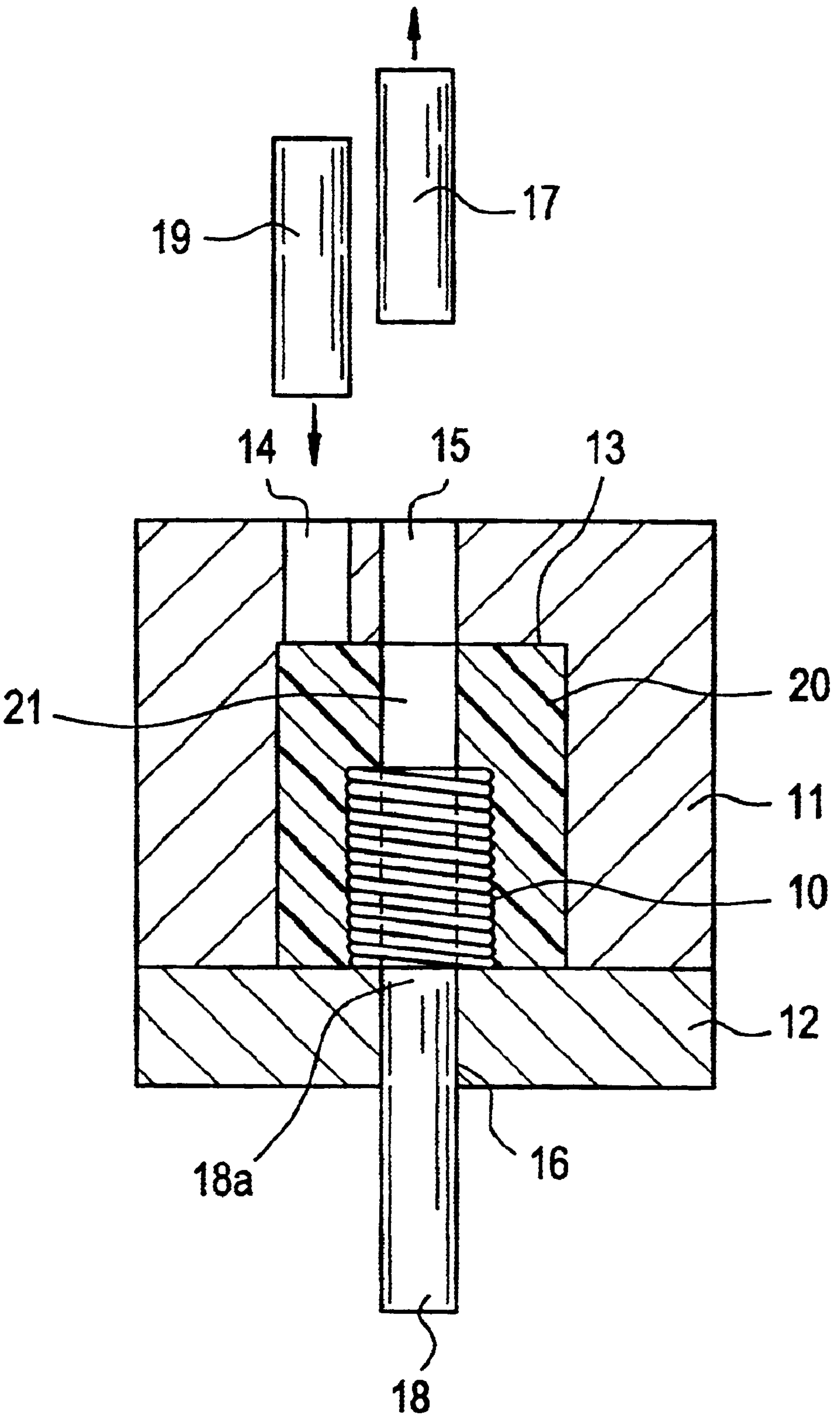
FIG. 3 is a sectional view illustrating a method of producing a molded body to be included in a bead inductor, according to a preferred embodiment of the present invention.

FIG. 3 illustrates a state after formation of an outer portion outside of the conductor coil 10 using the above-described molding method. In the cavity 13, a molded body 20 is formed outside of the conductor coil 10. After the formation of the molded body 20, the first spacer pin portion 18 is moved downward and pulled out of the molded body 20. The first spacer pin portion 18 is moved until its top end 18*a* is level with the top surface of the lower mold portion 12. Then, the first spacer pin portion 18 is fixed at that location.

The second spacer pin portion 17 is moved upward and pulled out of the molded body 20. Then, the second spacer pin portion 17 is pulled up through the second gate 15 and removed out of the mold. Pulling the first spacer pin portion 18 and the second spacer pin portion 17 out of the molded body 20 causes a space 21 to be formed in the approximate center portion of the molded body 20. The space 21 is formed so as to extend through the core of the conductor coil 10 and so as to lead to the second gate 15. A closing pin 19 is inserted into the first gate 14 in order to close the first gate 14.

Figure 4:
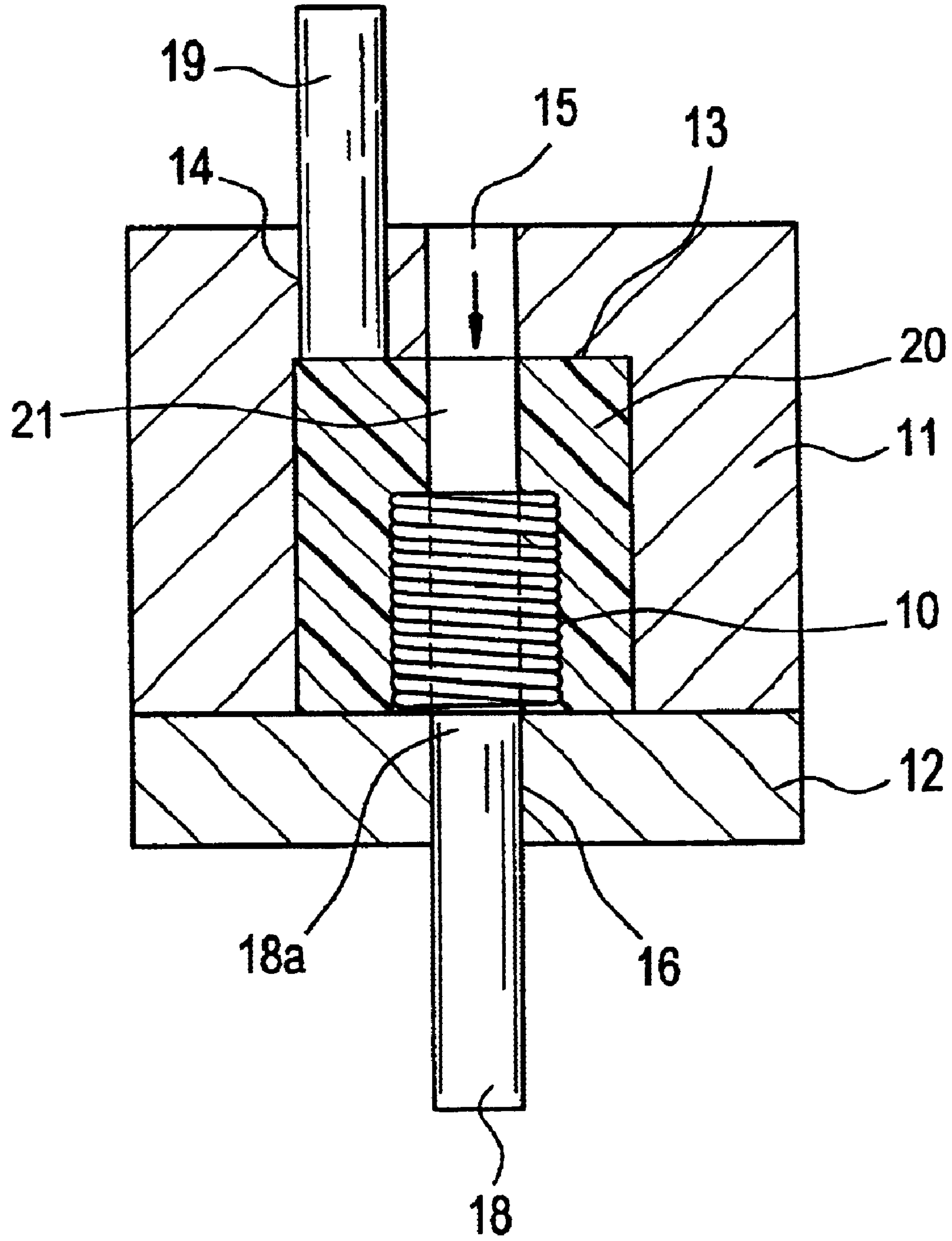
FIG. 4 is a sectional view illustrating a method of producing a molded body to be included in a bead inductor, according to a preferred embodiment of the present invention.

FIG. 4 illustrates the first gate 14 which has been closed as a result of inserting the closing pin 19 into the first gate 14. When the first gate 14 is closed, the second gate 15 leads to the space 21 in the approximate center portion of the molded body 20, and the space 21 leads to a portion located inside of the conductor coil 10.

Similar to the formation of the molded body 20, molten rubber or molten resin material is injected into the space 21 from the second gate-15 so as to form in the space 21 an inner portion inside of the conductor coil 10.

Figure 5:
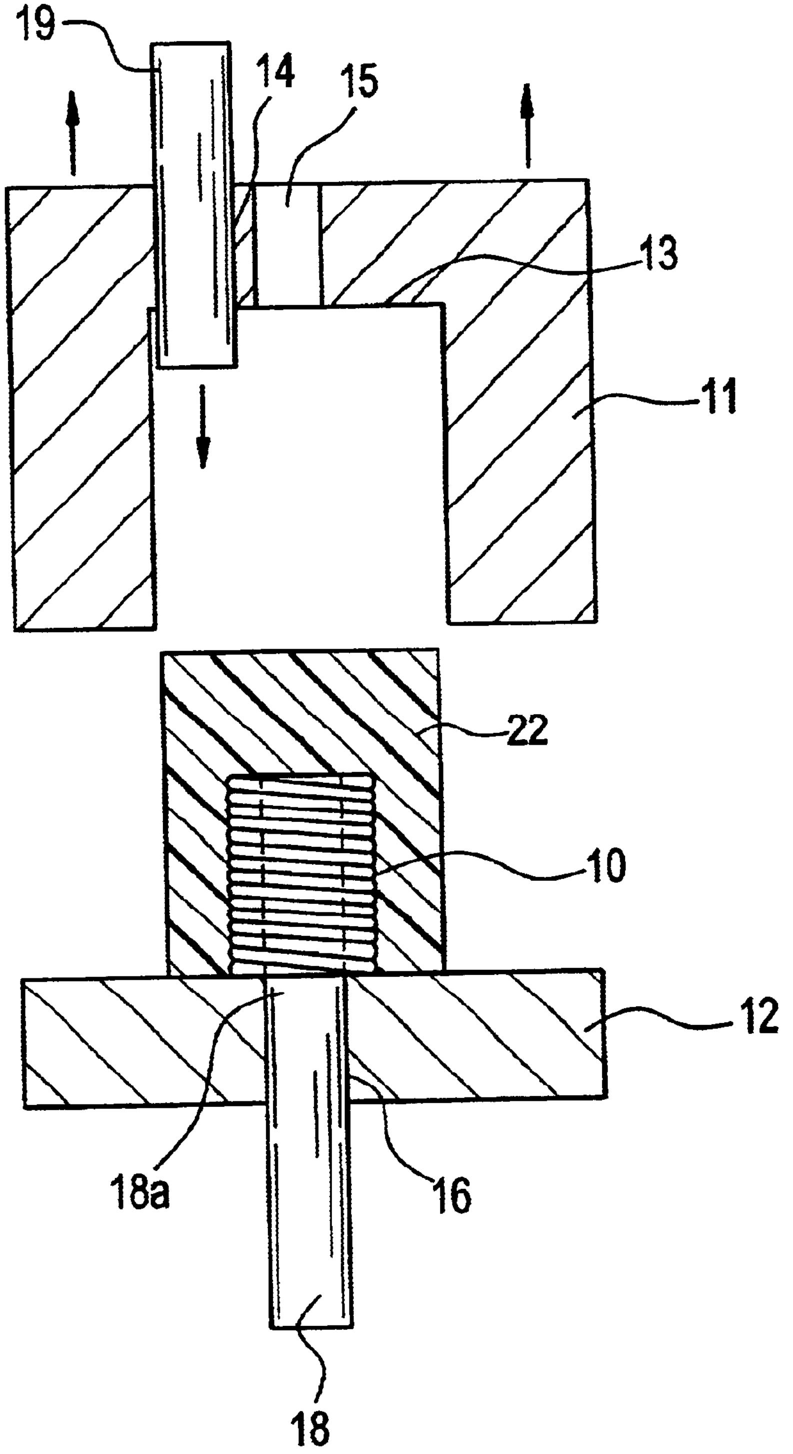
FIG. 5 is a sectional view illustrating a method of producing a molded body to be included in a bead inductor, according to a preferred embodiment of the present invention.
Figure 6:
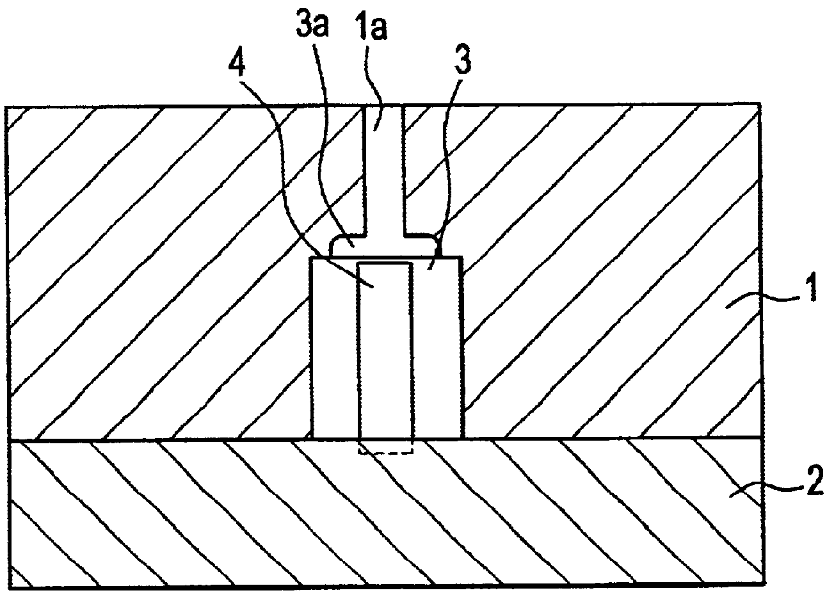
FIG. 6 PRIOR ART
FIG. 6 is a sectional view illustrating a related process of producing a molded body to be included in a bead inductor.
Figure 7:
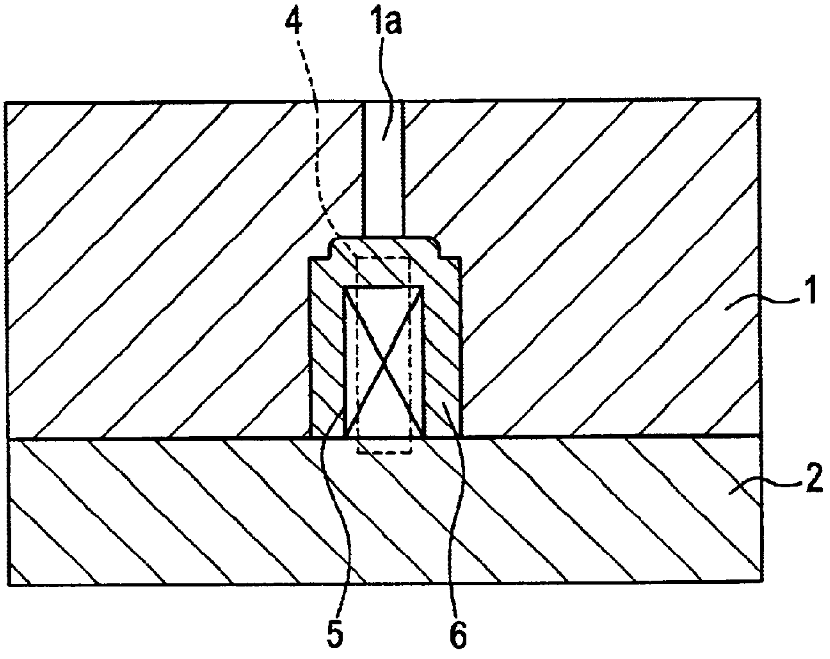
FIG. 7 PRIOR ART
FIG. 7 is a sectional view illustrating the related process of producing a molded body to be included in a bead inductor.
Figure 8A:
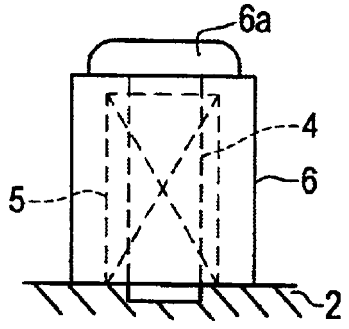
FIG. 8A PRIOR ART
FIGS. 8A, 8B, and 8C are sectional views illustrating the related process of producing a molded body to be included in a bead inductor.
Figure 8B:
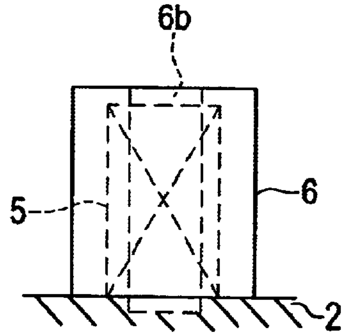
FIG. 8B PRIOR ART
Figure 8C:
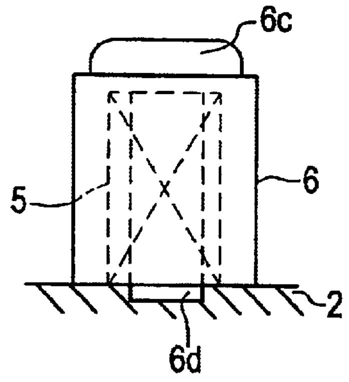
FIG. 8C PRIOR ART

FIG. 5 is a sectional view illustrating a state after formation of an inner portion inside of the molded body 20, in the space 21, using the above-described method. As shown in FIG. 5, filling the space 21 in the approximate center portion of the molded body 20 (shown in FIG. 4) results in the formation of a molded body 22 having the conductor coil 10 embedded therein. In the molded body 22 shown in FIG. 5, the core of the conductor coil 10 is also filled with resin or rubber material, which is preferably molded.

After the formation of the molded body 22, the upper mold portion 11 is moved upward relative to the lower mold portion 12 and separated therefrom, whereby the mold is opened, as shown in FIG. 5. Molded bodies 22 having the conductor coil 10 embedded therein tend to remain fitted to the upper mold portion 11 in which cavity 13 is formed. In such a case, molded bodies 22 are ejected from the upper mold portion 11 by moving the closing pin 19 in the first gate 14 downward and pushing out the molded bodies 22.

As described above, a molded body 22 with a conductor coil 10 embedded therein is produced. In the next molding cycle after the ejection of the molded body 22 from the mold, the first spacer pin portion 18 is moved upward in order to set the mold in the state shown in FIG. 2. Then, the conductor coil 10 is inserted onto the first spacer pin portion 18 to form the next molded body.

Figure 9:
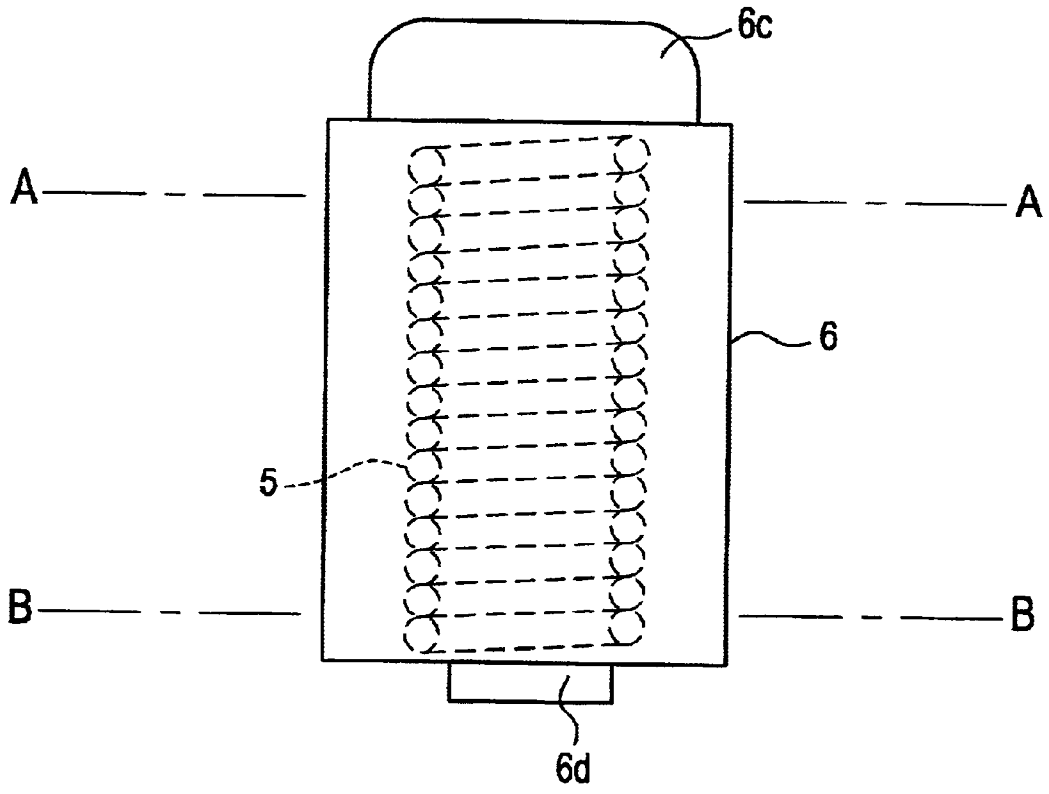
FIG. 9 PRIOR ART
FIG. 9 is a sectional view of a molded body produced by the related production method.
Figure 10:
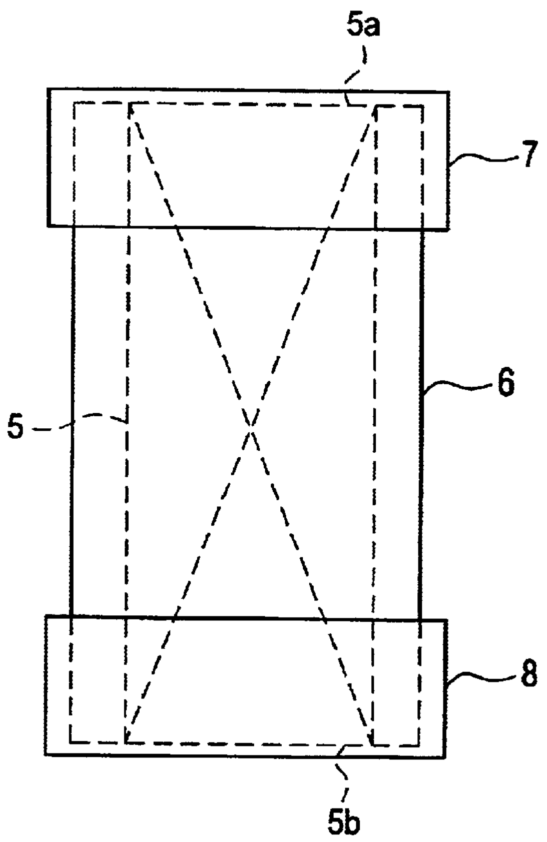
FIG. 10 PRIOR ART
FIG. 10 is a side view of a bead inductor.
Figure 11:
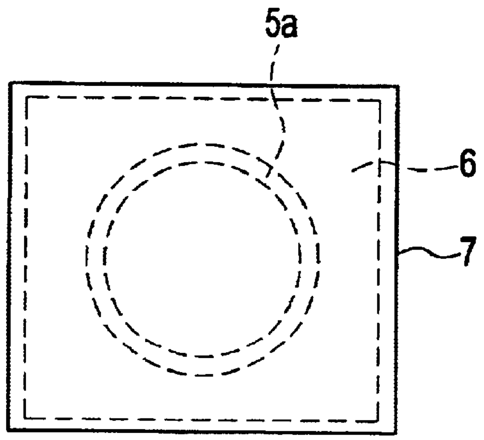
FIG. 11 PRIOR ART
FIG. 11 is a plan view of the bead inductor.

Like the ends of the molded body of FIG. 9 produced by the related method, both ends of the molded body 22 obtained by the above-described method are cut with a dicing saw or similar device so that the ends of the conductor coil are exposed. Like the exposed ends shown in FIGS. 10 and 11, the exposed ends of the conductor coil in the preferred embodiments have external terminal electrodes, such as metallic caps, mounted thereon so as to complete a bead inductor.

As can be understood from the foregoing description, according to preferred embodiments of the present invention, after formation of an outer portion outside of the conductor coil 10 via molding, an inner portion can be formed inside of the conductor coil 10 without taking the molded body 20 out of the mold. Therefore, molded bodies used to form bead inductors can be efficiently produced. Since manual operations do not have to be carried out during the molding process, the molding process can be automatically controlled, making it possible to repeat by automatic control the molding process cycle which includes placing the conductor coil into a mold, forming an outer portion outside of the conductor coil via molding, forming an inner portion inside of the conductor coil via molding, and ejecting the molded body. Therefore, molded bodies can be automatically produced, and operation efficiency of the injection mold can be greatly increased, allowing a large number of molded bodies to be produced with high efficiency.

Although in the above-described preferred embodiment, as shown in FIG. 3, the second spacer pin portion 17 is pulled out of the mold and the first gate 14 is closed by inserting a closing pin 19 therein, the first gate 14 can be closed by inserting therein the second spacer pin portion 17 pulled out of the mold from the second gate 15. In other words, the second spacer pin portion 17, instead of the closing pin 19, can be used as closing pin.

According to one aspect of preferred embodiments of the present invention, there is provided a method of producing a bead inductor, in which after the formation of the outer portion outside of the conductor coil, molded bodies with a conductor coil embedded therein can be produced by forming an inner portion inside of the conductor coil, without taking out the outer portion from the mold. This makes it possible to produce molded bodies used to form bead inductors very efficiently and automatically.

An accommodating hole may be formed in the mold to allow insertion and removal of the spacer pin into and from the cavity. This makes it possible to provide an improved production method which allows automation of the molding process.

The mold may include an upper mold portion and a lower mold portion. This makes it possible to stably dispose the conductor coil in the mold.

When the mold includes an upper mold portion and a lower mold portion, the spacer pin may be divided into a first spacer pin portion and a second spacer pin portion and formed so as to pass through the mold cavity. Here, the spacer pin is formed by bringing the first spacer pin portion and the second spacer pin portion into contact with each other in the cavity, thereby making it easier to design the upper mold portion and the lower mold portion so that they are, for example, positioned precisely with respect to each other.

When the spacer pin is divided into a first spacer pin portion and a second spacer pin portion and formed so as to pass through the mold cavity, the first gate may be formed in the upper mold portion. This makes it easier to design, for example, a molding machine or a mold.

When the spacer pin is divided into a first spacer pin portion and a second spacer pin portion and formed so as to pass through the mold cavity, or when the first gate and the second gate are formed in the upper mold portion, the conductor coil may be positioned by inserting the core of the conductor coil onto the first spacer pin portion. This makes it easier to design a molding machine.

The first gate may be closed by inserting a closing pin into it. This simplifies the structure of, for example, a molding machine or a mold.

When the first gate is closed by inserting a closing pin into it, the molded body may be ejected from the mold by using the closing pin used to close the first gate. This simplifies the structure of, for example, a molding machine or a mold, and allows the molded body to be ejected automatically after molding.

When the first gate is closed by inserting a closing pin into it or when the molded body is ejected from the mold via the closing pin used to close the first gate, the second spacer pin portion may be used as the closing pin. This simplifies the structure of, for example, a molding machine or a mold.

A molding process including the steps of inserting the conductor coil into the mold cavity, forming the outer portion outside of the conductor coil via molding, forming the inner portion inside of the conductor coil via molding, and ejecting the molded body from the mold can be repeated by automatic control. This makes it possible to automate the molding process carried out to form a bead inductor molded body, making it possible to increase operation efficiency of the molding machine, and to mass-produce molded bodies economically.

According to another aspect of preferred embodiments of the present invention, there is provided an apparatus for producing a molded body to be included in a bead inductor, in which after the formation of the outer portion outside of the conductor coil via molding, an inner portion can be formed inside of the conductor coil, without taking out the outer portion from the mold. This makes it possible to produce molded bodies efficiently.

In the aforementioned device, the closing pin may be used as the second spacer pin portion. Therefore, the structure of, for example, an injection mold or a mold can be simplified. This makes it possible to automate the molding process and to greatly reduce molding costs.

When the apparatus according to preferred embodiments of the present invention is used or when the closing pin is used as the second spacer pin portion, the molded body may be pushed out of and ejected from the cavity by moving the closing pin downward. This allows the molded body to be easily and automatically ejected.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An apparatus for producing a molded body to be included in a bead inductor, in which the molded body is formed in a mold cavity via injection molding when producing the bead inductor by electrically connecting external terminal electrodes to both ends of a hollow core conductor coil disposed in the molded body formed by embedding the hollow core conductor coil in rubber or resin material containing magnetic powder, the apparatus comprising:

an upper mold portion having a first gate and a second gate arranged to allow the resin or the rubber material to be supplied into the mold cavity;

a lower mold portion which is fitted to the upper mold portion to define the mold cavity, the lower mold portion having an accommodating hole in a portion thereof located a position substantially corresponding to an approximate center portion of the mold cavity;

a first spacer pin portion movably disposed in the accommodating hole in the lower mold portion;

a second spacer pin portion movably disposed in the second gate in the upper mold portion; and a closing pin movably disposed in the first gate in the upper mold portion.

2. An apparatus according to claim 1, wherein after the core of the conductor coil is inserted onto the first spacer pin portion which is upwardly pushed out of the accommodating hole formed in the lower mold portion, the upper mold portion and the lower mold portion are arranged to be fitted together to define the cavity used for the injection molding.

3. An apparatus according to claim 1, wherein the second spacer pin portion is arranged to be pushed downward so that the second spacer pin portion is pushed out of the second gate in the upper mold portion in order to bring the second spacer pin portion into contact with the first spacer pin portion so as to define a spacer pin which passes through the cavity.

4. An apparatus according to claim 1, wherein the first gate is arranged such that the resin or the rubber material is supplied into the cavity from the first gate to define an outer portion outside of the conductor coil via molding.

5. An apparatus according to claim 4, wherein after the molding, the first spacer pin portion is pulled out so that the first spacer pin portion is accommodated in the accommodating hole formed in the lower mold portion, and the second spacer pin portion is pulled out and removed out of the mold from the second gate, the closing pin is inserted into the first gate to close the first gate, and from the second gate the resin or the rubber material is supplied into a space formed inside of the conductor coil, by pulling out the first spacer pin portion and the second spacer pin portion, whereby the molded body with the conductor coil embedded therein is formed.

6. An apparatus according to claim 1, wherein the closing pin is used as the second spacer pin portion.

7. An apparatus according to claim 1, wherein after the formation of the molded body with the conductor coil embedded therein, the upper mold portion and the lower mold portion which have been fitted together are separated from each other, and the closing pin is moved downward to push out and eject the molded body from the cavity.

* * * * *